Nov. 7, 1967    L. L. WEISGLASS    3,351,766
COLOR BALANCE COMPUTER FOR MAKING COLOR PRINTS
Filed Oct. 13, 1964    2 Sheets-Sheet 1
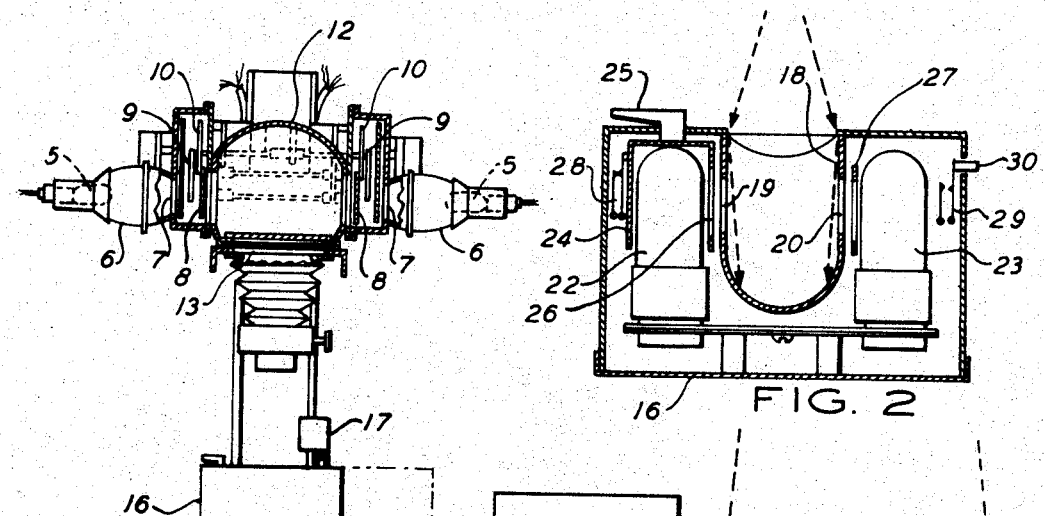
FIG. 1
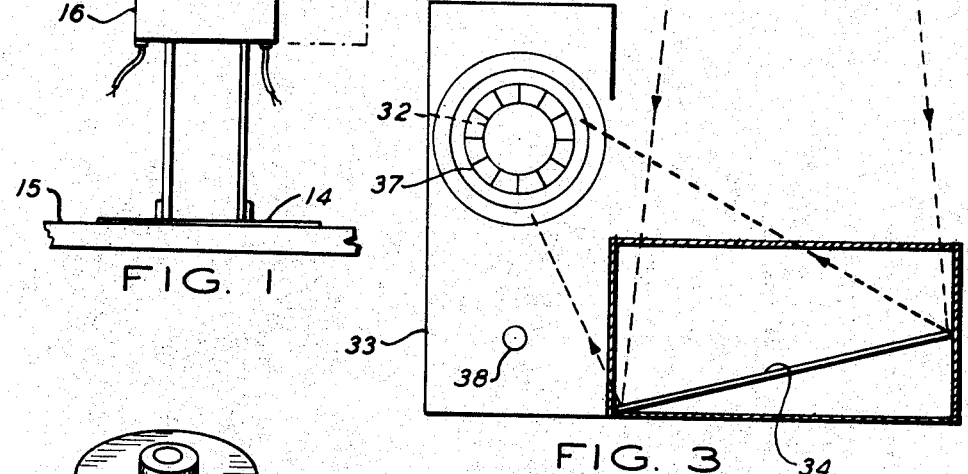
FIG. 2
FIG. 3
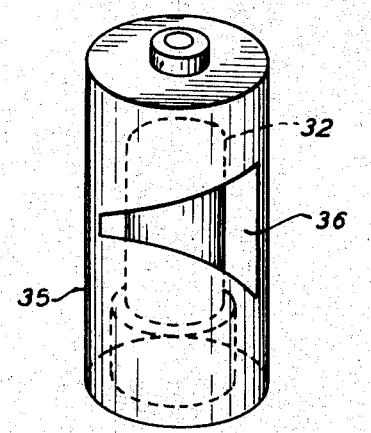
FIG. 4
INVENTOR.
LOUIS L. WEISGLASS
BY
ATTORNEY

United States Patent Office 3,351,766
Patented Nov. 7, 1967

3,351,766
COLOR BALANCE COMPUTER FOR MAKING COLOR PRINTS
Louis L. Weisglass, New York, N.Y., assignor to Simmon Brothers, Inc., Long Island City, N.Y., a corporation of New York
Filed Oct. 13, 1964, Ser. No. 403,566
5 Claims. (Cl. 250—226)

ABSTRACT OF THE DISCLOSURE

A color balance computer for photographic printers and enlargers in which two color sensing photocells and one density sensing photocell are connected to a differential circuit to fire thyratron tubes and thus light indicator lamps when the proper color and density for photographic printing is achieved. One of the color sensing photocells is surrounded by a two filter shield for changing its color sensitivity so that two photocells may be used to balance three primary colors. Rotating the filter shield changes filters and also changes the parameters of the differential circuit by means of a switch provided on the filter shield housing. The density sensing photocell is provided with a rotatable shield having a variable cross-sectioned aperture calibrated in equal density shifts for equal angles of rotation. The color sensing photocells are located in a housing which can be swung into a position immediately beneath the lens system of the enlarger as printer while the density sensing photocell is located in an L-shaped housing which can be placed on the photographic paper support easel.

---

Figure 5:
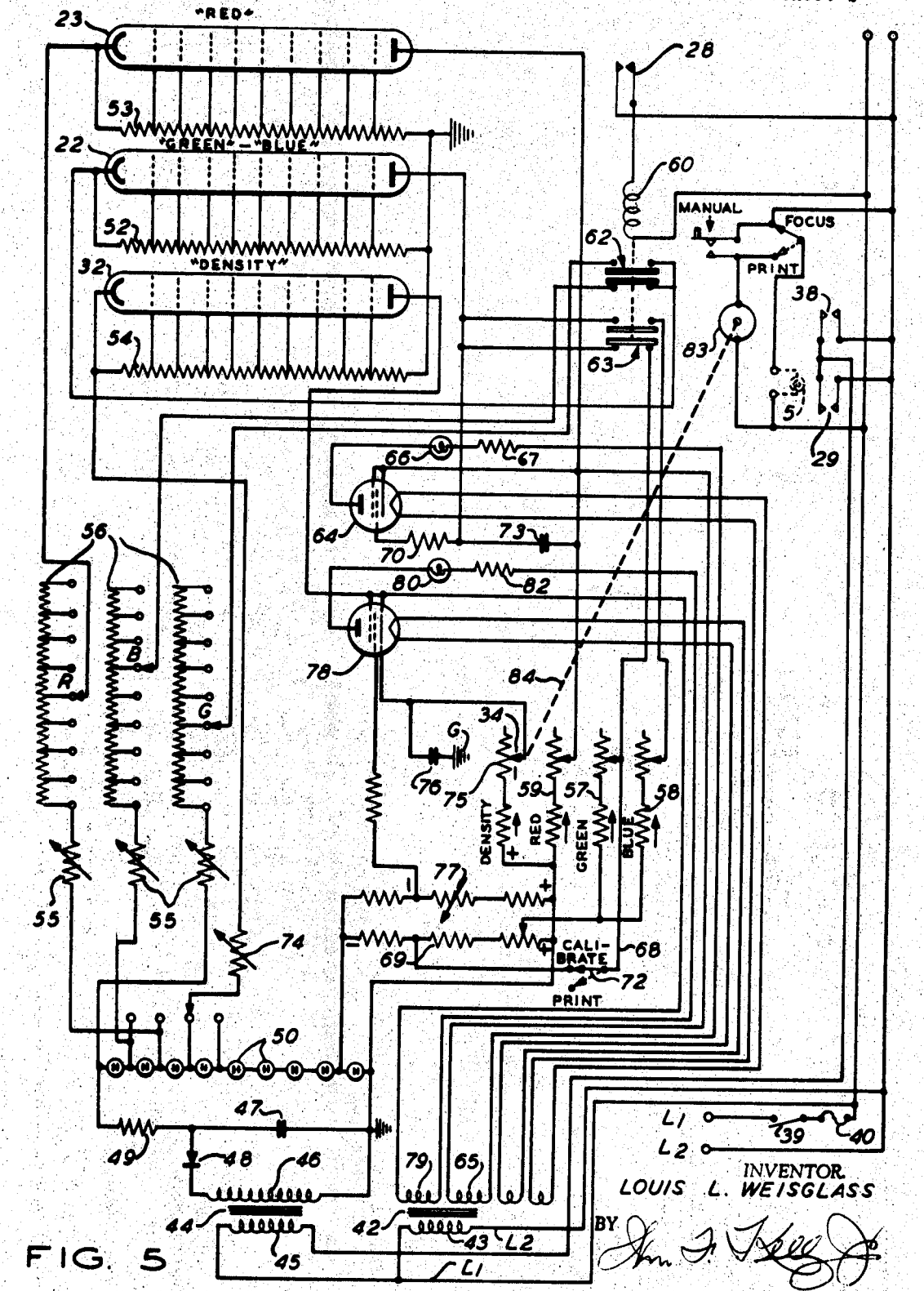

The present invention relates to a color computer for determining color balance and exposure time for the making of color prints from color negatives or transparencies which is accurate in its operation and economical in cost.

Devices of this nature are well known in the art but heretofore have been of high manufacturing cost and of a complicated nature thus restricting use thereof more or less to experts in the art because amateurs could not afford such devices nor devote the necessary time to acquaint themselves with the complicated operation thereof.

It is accordingly the primary object of the present invention to provide a color computer for determining color balance and exposure time for the making of color prints which is of economical cost and yet dependable in its operation.

Another object of the present invention is the provision of a color computer operable to accurately determine the color balance and exposure time for the making of color prints from a transparency which is economical in initial and operating costs yet simple and accurate in its operation.

A further object of the present invention is the provision of a color computer for the making of color prints from a film transparency utilizing a simple low-cost circuit yet provided with all necessary adjustable variables for proper computation and which is easy and fast to operate while maintaining sensitivity and accuracy.

The foregoing objects together with others which will become apparent to those skilled in the art as the following description proceeds are achieved in accordance with the present invention by the provision of a color computer wherein a sensing device is employed to indicate when the differential voltage drop resulting from a scanning of the primary colors falling upon first one and then another photoelectric cell equals zero. Moreover, the scanning of the primary colors of red, blue and green is accomplished by the use of only two photocells while density determination is accomplished by the use of a further photoelectric cell surrounded by a rotatable aperture calibrated in equal density shifts for equal angles of rotation. The two photoelectric cells when placed under the lens accordingly scan the full area of the color negative, and if the red minus the green photocell currents and the red minus the blue photocell currents are balanced to zero, the average color of the print will integrate to a neutral gray. To determine correct density the third photoelectric cell is placed directly on the easel or base on which the sensitized paper is to be placed and an important area of the film transparency is then selected to determine the correct print density. Since this method of density determination is thus independent of magnification no feed-back of information into the computer is necessary which thus results in simplified circuitry as well as expediting the procedure of analysing.

The present invention may be more fully appreciated by reference to the accompanying drawings wherein:

FIGURE 1 shows the illuminating system of a photographic printer or enlarger of a type used in the making of color prints and enlargements and with which the color computer of the present invention is employed, FIG. 2 is a cross-sectional view of the color balancing photocell housing which is rotatable into the field of the light beam when desired, FIG. 3 is an elevational end view partly in section and showing the density photocell housing which is placed on the easel in the field of the light beam when density determination is desired, FIG. 4 is an elevational view of the rotatable aperture for the density photocell and which aperture is calibrated in equal density shifts for equal angles of rotation, and FIG. 5 is a schematic illustration of the circuitry of the color computer of the present invention.

Referring now to the drawings in detail the illuminating system as shown in FIG. 1 is of the type as described and claimed more in detail in the U.S. Patent No. 3,028,483, granted Apr. 3, 1962, and of which the present applicant is a co-inventor, and assigned to the same assignee as the present invention. It should accordingly suffice to herein mention that such system may include a lamp 5 but preferably comprises several which are respectively surrounded by specular light-collecting reflectors 6 whereby a very high percentage of the emitted light is caused to pass through an aperture 7 in front of which a number of adjustable filters 8, 9 and 10 are arranged. These filters are preferably in colors complementary to the primary colors of the selected system, i.e., in a three color system with the customary primary colors of red, green and blue, the filters 8, 9 and 10 would be "cyan," "magenta" and "yellow."

After passing through one or several of these filters the light enters a mixing chamber or integrating sphere 12, which has a non-glossy, diffusely reflecting white interior, so that by repeated diffuse reflection the light is uniformly distributed over the area of a film transparency 13 and passes therethrough where the usual adjustable focusing lens projects an enlarged image of the transparency on a sensitized color paper 14 which is disposed a suitable distance below the lens on an easel or base 15. Also, as shown in FIG. 1, the entire assembly is attached to a supporting structure which extends vertically from the easel or base that supports the sensitized paper. Each of the filters 8, 9 and 10 are adjustable either manually or automatically by individual reversible motors connected to each filter of the same color so that all identical color filters are operated simultaneously by its own individual motor into and out of the light beam emerging from the respective apertures 7 and passing into the mixing chamber 12. The filters 8, 9 and 10 are operable by the operator or their motors are energized in response to preselected settings made by the operator to the device as determined by the color computer of the present invention.

In order to determine the proper setting of the filters 8, 9 and 10, so as to produce with fidelity the same color rendition as that of the transparency 13, the present color computer includes a light distributing housing 16 supported by a bracket or the like 17 affixed to the light assembly, so as to be swung into a position immediately beneath the lens system into the path of the light beam emerging from the sphere 12 and passing through the film negative or transparency 13. As shown more clearly in FIG. 2, the light distributing housing 16 is provided with an integrating sphere 18 having a collecting lens at its entrance end and a light reflecting surface on its interior, together with diametrically disposed windows 19 and 20 in its side wall. A pair of photosensitive devices, which preferably are photomultiplier tubes 22 and 23, are supported interiorly of such housing 16 immediately adjacent the windows 18 and 19 in the wall of the integrating sphere 18. The photomultiplier tube 22 is surrounded by a hood 24 rotatable by an exteriorly disposed handle 25 through an angle of at least 90°, so as to dispose either a blue or green filter 26 forming part of the wall of such hood, between the photomultiplier tube 22 and the window 19 of the integrating sphere 18 while a red filter 27 is positioned between the sphere window 20 and the photomultiplier tube 23. The housing 16 is also provided with a switch 28 operable upon rotation of the hood 24 by the handle 25 and a second switch 29 which is closed by depression of a button 30 protruding through the housing wall, with both switches forming part of the electrical circuitry as hereinafter described.

For the purpose of preselecting the proper density of a color print or enlargement an additional photomultiplier tube 32 is utilized. This latter tube 32 is disposed horizontally in the vertical portion of an L-shaped housing 33, as shown in FIG. 3, and which housing is placed on the base or easel 15 in the path of the light beam after it has passed through the transparency 13 and emerges from the focusing lens. The base portion of the housing 33 is open at the top so that such light beam can impinge upon a white diffused angularly disposed surface 34 from which a relatively large image area of the transparency is reflected angularly upward where it falls upon the photocell 32. However, this latter photocell 32 is surrounded by a rotatable light shield 35 which, as shown in FIG. 4, is provided with a variable cross-sectioned aperture 36 with such shield 35 being rotatable by a dial 37 (FIG. 3) calibrated in density shifts corresponding to equal angles of rotation of the variable cross-sectioned aperture of the shield 35. When properly set the photocell 32 is energized from its supply source, as hereinafter described more in detail, upon depression of a push-button 38 in the wall of the housing 33.

Referring now to the circuitry as shown in FIG. 5, the color computer of the present invention comprises a source of electrical energy L1–L2 for energizing the computer upon closure of a main line switch 39 with the computer suitably protected by a fuse or the like 40. A supply transformer 42 has its primary winding 43 energized from the supply source L1–L2 upon closure of the main line switch 39, while a high tension transformer 44 has its primary winding 45 energized from the source of supply L1–L2 only after closure of the switch 29 by depression of the button 30 on the light distributing housing 16, or by depression of the push-button switch 38 in the wall of the density photocell housing 33, as hereinbefore mentioned, with closure of either switch 29 or 38 being of momentary duration sufficient to make the desired measurements and to prevent damage to the photocells 22 and 23 or 32 by strong ambient light.

Upon momentary energization of transformer 44 its high tension secondary winding 46 charges a capacitor 47 with a high tension D.C. potential through a rectifier 48. The discharge circuit for such capacitor 47 includes a resistor 49 and a battery of gas stabilizer tubes 50, operable as a stabilizer arrangement for the purpose of making the photocell supply voltages supplied by transformer secondary 46 independent of line voltage fluctuations, although other types of electronic controlled stabilizing circuits and employing other devices, such as zener diodes or corona tubes, can just as readily be utilized to stabilize the photocell supply voltages. Each of the photocells 22, 23 and 32 are provided with their own voltage divider resistance network 52, 53 and 54, respectively, for the purpose of supplying their dynodes with staggered voltage, while the voltage value supplied to the photocell 22, when functioning alternately as the "green" and "blue" cell, as well as the "red" photocell 23, is regulated by a bank of course adjustable resistors 55 and fine adjustable resistors 56. The value of the photocell currents for the photomultiplier tube 22, when alternately operating as "green" and "blue" and the current value for "red" photocell 23, is controlled by separate resistors 57, 58 and 59 each composed of a fixed and a variable section.

It can thus be seen from FIG. 5 that high tension D.C. energy is supplied from one end of transformer secondary 46 and the bank of stabilizer tubes 50 through voltage control resistors 55–56 to "red" photocell 23 and thence through current control resistor 59 to the grounded opposite end of the stabilizer tube bank 50 and the transformer secondary 46 to thus enable measurement of the "red" radiations falling on photocell 23. The selection of photocell 22, for operation in sequence to first measure the "green" and then the "blue" radiation, is controlled by a relay 60 provided with a pair of contacts 62 and a second pair of contacts 63. In the unenergized state of this relay 60 its lower closed contact 62 completes the circuit from the high tension secondary 46 through the "green" voltage control resistor 56 to photocell 22, for measuring the "green" radiation since the rotatable hood 24 at this time will have positioned the "green" filter 26 between the photocell 22 and the window 19 of integrating sphere 18, and the lower closed relay contact 63 connects the opposite end of photocell 22 to the "green" current-control resistor 57 and hence to the opposite end of secondary winding 46. After having measured the "green" radiation, as hereinafter described more in detail, the operator then turns the handle 25 (FIG. 2) to rotate the hood 24 to move the "green" filter out of its position and move the "blue" filter into position adjacent the window 19 with such rotation causing closure of the housing switch 28.

Closure of this latter switch 28 energizes relay 60 by connecting it to the source of supply L1–L2 with the result that the relay armature is moved thereby interrupting the "green" photocell circuit completed by its normally-closed lower contacts 62 and 63 and causing its normally-open upper contacts 62 and 63 to close. In doing so such upper contacts connect the "blue" voltage control resistor 56 and the "blue" current-control resistor 58 to the photocell 22 thus completing a similar circuit for measuring the "blue" radiation. Accordingly, the light beam passing through the negative 13 and falling first upon the "green" photocell 22 and "red" photocell 23 will give an indication of the differential of the "red" photocell current minus the "green" photocell current, and when the hood 24 is rotated to remove the "green" filter 26 and substitute the "blue" filter in position adjacent the window 19 an indication of the differential of the "red" photocell current minus the "blue" photocell current results. Since all the current passes through resistors even though the "green" and the "blue" is in sequence, color balance is achieved when the differential voltage drop between the "red" minus the "green" voltage and the "red" minus the "blue" voltage are zero.

For the purpose of indicating such zero differential voltage drop a thyratron tube 64 is utilized as the sensing device. The plate circuit of such tube 64 is supplied from a secondary winding 65 of the transformer 42 and includes a zero differential indicating lamp 66 and an inverted resistor 67 to cause dim lighting of the lamp which decreases to extinguishment as the voltage differential increases and is completely lighted when the voltage differential is at desired zero. A bias potential is impressed upon the grid of thyratron 64 by a conductor 68 extending from a bias potential divider 69, the normally closed lower relay contacts 63 and a resistor 70, when a switch 72 is in its closed "calibrate" position. The differential voltage drop across "red" resistor 59 minus that across "green" resistor 57 and that of the "red" resistor 59 minus that across "blue" resistor 58 are fed to the grid of the thyratron 64, the "red" through a capacitor 73 and the "green" by lower relay contacts 63, so that such thyratron accordingly becomes less conductive the greater the differential voltage drop and when such becomes zero the thyratron is rendered fully conductive and the indicator lamp 66 is completely lighted.

By first subjecting the photocell 22 with the "green" filter 26 interposed along with the "red" photocell 23 to the reflected light beam after it has passed through the negative 13 and thereafter rotatiing the hood 24 to interpose the "blue" filter in front of the photocell 22 at the same time the light continues to fall upon the "red" photocell 23, an indication is accordingly given to the operator by the condition of the indicating lamp 66 as to the correction, if any, that is needed to the adjustment of complementary color filters 8, 9 and 10 of the light unit to produce the desired color rendition for the finished print or enlargement. Also, the variable resistor sections of the resistors 57, 58 and 59 are operable as color corrective devices if the color rendition of the print indicates that such a correction is desirable by a gray area of a color negative rendering a gray print.

Although the photocells 22 and 23 within the housing 16 are operable to give an indication of color rendition, the correct density is determined by the above mentioned photocell 32 within the L-shaped housing 33, as seen in FIG. 3. This housing is placed on the base 15 so that the light beam passing through the negative 13 casts a relatively large area of the image on the diffused white reflecting surface 34, as previously mentioned, after the housing 16 has been rotated about its support 17 out of the light beam. Such reflected image accordingly falls upon the photocell 32 after passing through the adjusted variable cross-sectioned aperture 36 of the cylindrical shield 35 thus determining the density of the print.

It will be again noted from the circuitry of FIG. 5, that upon depression of the push-button switch 38 in the wall of housing 33, the transformer 44 is again energized from the source of supply L1–L2 causing its secondary winding 46 to again supply a high D.C. potential across the bank of stabilizer tubes 50. The density photocell 32 in turn is supplied with a voltage tapped from this bank of stabilizer tubes 50 since normally a lower voltage is used for this photocell 32 than the total voltage supplied by transformer secondary 46 with fine regulation of this lower photocell voltage being obtained by adjustment of a variable resistor 74. The plate current of this density photocell 32 flows through a resistor 75 and back to the bank of stabilizer tubes 50 and hence to the opposite end of transformer secondary 46. This resistor 75 is grounded at "G" through a capacitor 76 and is similar to resistors 57, 58 and 59 in being provided with a fixed and variable section and the voltage drop across such resistor 75 is bucked by a D.C. voltage produced by a potential divider 77. The differential voltage resulting therebetween is then transmitted as a grid bias to a second thyratron tube 78 having its plate circuit supplied from a secondary winding 79 of the transformer 42 with such plate circuit including a density indicating lamp 80 and a resistor 82. Accordingly at a predetermined light intensity falling on density photocell 32 the indicating lamp 80 becomes lighted.

The variable section of resistor 75 in effect forms part of a timer since variation of such section is in response to operation of a timer motor 83 from which the arm of the variable section is directly driven by a suitable shaft or the like 84 in accordance with the timer setting. Upon depression of a switch 85 the timer 83 operates to complete the energizing circuit for the printing lamp 5 (FIG. 1) until the expiration of the period for which the timer was preselected after which the switch 85 is then opened by the motor itself to deenergize the lamp 5. Since exposure time has a direct relation to density the variable section of resistor 75 is operated to increase the resistance when the timer 83 is set for longer exposure times.

The well known law of reciprocity holds that when the light intensity and time integral are constant this should produce the same print densities. Consequently this would seem to indicate that the resistance of variable resistor section 75 should be made to proportionally increase with time. However, it is equally well known that unfortunately there is a failure of this law of reciprocity due to variation in the photosensitive layers of the sensitized paper from which the prints are made and hence if exposures are long the density decreases. It is therefore a simple matter to electrically compensate for this failure of reciprocity by intentionally distorting the proportional relationship of resistance to time to overcome the fall-off of density at long exposure times which is done in the present instance by the automatic adjustment of the variable resistance section of resistor 75 in response to operation of the timer 83 so that such direct proportionality does not exist. Moreover, the rotatable light shield 35 with its variable aperture 36 calibrated in equal density shifts corresponding to equal angles of rotation can be accurately preselected in accordance with the graduated dial 37 thus facilitating setting of the timer along with the selection of other factors.

It should accordingly become apparent to those skilled in the art that a computer for determining the color balance for the making of color prints has been provided by the present invention which is economical in initial and operating costs while at the same time being simple and dependable in its operation. Moreover, a differential current method is employed to measure variation in color balance of two primary colors utilizing a single photoelectric cell for each separate color in sequence. Also, for density measurement of a film negative a separate cell is employed enclosed in a shield having a variable aperture to produce equal density shifts for equal angles of rotation of such shield and the differential between photocell current compared with a constant D.C. reference voltage is utilized as density determination.

Although one specific embodiment of the present invention has been herein shown and described it is to be understood that still further modifications thereof may be made without departing from the spirit and scope of the appended claims:

I claim:
1. A color balance computer for photographic printers and enlargers used in the making of color prints comprising:
 (a) a plurality of color filters each of which is operable to control the intensity of light of one of the primary colors in a light beam passed through a film transparency and impinging upon sensitized paper during the making of a print,
 (b) means operable to measure the intensities of several different color components of the light beam of said photographic printer including a housing supporting a first photosensitive tube operable to pass current proportional to the intensity of one color component in the light beam impinging thereon after passing through one primary color filter, and a second photosensitive tube in said housing surrounded by a shield having filters of two other primary colors forming a part of the wall thereof, and said shield being rotatable to subject said second photosensitive tube to the light beam after passing first through one filter and then the other to render such tube operable to sequentially pass a current proportional to the intensity of a second and then a third color component of said light beam,
(c) voltage generating means connected to said photosensitive tubes and operable in response to the passage of current therethrough to produce voltages proportional to such respective current values, and said voltage generating means being operable in response to the intensity of the light initially passing through said respective color filters to cause a voltage differential between a first and second of said proportional voltages and between the first and a third proportional voltages respectively, and
(d) electronic switching means connected to said voltage generating means and operable to cause illumination of an electric indicator lamp upon adjustment of said color filters and said voltage differentials thereupon becoming zero.

2. A color balance computer for photographic printers and enlargers used in the making of color prints comprising:
(a) a plurality of color filters each one of which is operable to control the intensity of light of one of the primary colors in a light beam passed through a film transparency and impinging upon sensitized paper during the making of a print,
(b) means operable to measure the intensities of several different color components of the light beam of said photographic printer including a first photosensitive tube operable to pass a current proportional to the intensity of one color component in the light beam impinging thereon and a second photosensitive tube operable to sequentially pass a current proportional to the intensity of a second and then a third color component in the light beam impinging thereon,
(c) voltage generating means connected to said photosensitive tubes and operable in response to the passage of current therethrough to produce voltages proportional to such respective current values, and said voltage generating means being operable in response to the intensity of the light initially passing through said respective color filters to cause a voltage differential between a first and second of said proportional voltages and between the first and a third proportional voltages respectively,
(d) electronic switching means connected to said voltage generating means and operable to cause illumination of an electric indicator lamp upon adjustment of said color filters and said voltage differentials thereupon becoming zero, and
(e) density measuring means operable to determine the proper density for a photographic print comprising a third photosensitive tube operable to pass a current proportional to the intensity of the light impinging thereon from the light beam passed through the film transparency and a direct current source for supplying a constant reference voltage connected to said third photosensitive tube, and said density measuring means including an electronic tube operable to cause illumination of a second electric indicator lamp when a differential voltage is produced between the constant reference voltage and the voltage across said third photosensitive tube when a predetermined light intensity impinges on the latter.

3. A color balance computer for photographic printers and enlargers used in the making of color prints comprising:
(a) a plurality of color filters each one of which is operable to control the intensity of light of one of the primary colors in a light beam passed through a film transparency and impinging upon sensitized paper during the making of a print,
(b) means operable to measure the intensities of several different color components of the light beam of said photographic printer including a first photosensitive tube operable to pass a current proportional to the intensity of one color component in the light beam impinging thereon and a second photosensitive tube operable to sequentially pass a current proportional to the intensity of a second and then a third color component in the light beam impinging thereon,
(c) voltage generating means connected to said photosensitive tubes and operable in response to the passage of current therethrough to produce voltages proportional to such respective current values, and said voltage generating means being operable in response to the intensity of the light initially passing through said respective color filters to cause a voltage differential between a first and second of said proportional voltages and between the first and a third proportional voltages respectively,
(d) electronic switching means connected to said voltage generating means and operable to cause illumination of an electric indicator lamp upon adjustment of said color filters and said voltage differentials thereupon becoming zero, and
(e) density measuring means for independently determining the proper density for a photographic print comprising a second housing adapted to be disposed in the light beam passing through the film transparency and containing a third photosensitive tube surrounded by a shield having a variable cross-sectioned aperture calibrated in equal density shifts for equal angles of rotation and said photosensitive tube being operable to pass a current proportional to the intensity of the light impinging thereon through said calibrated aperture from the light beam emanating through the film transparency, a direct current source for supplying a constant reference voltage connected to said third photosensitive tube, and said density measuring means including an electronic tube operable to cause illumination of a second electric indicator lamp when a differential voltage is produced between the constant reference voltage and the voltage across said third photosensitive tube when a predetermined light intensity impinges on the latter.

4. A color balance computer for photographic printers and enlargers used in the making of color prints comprising:
(a) a plurality of color filters each one of which is operable to control the intensity of light of one of the primary colors in a light beam passed through a film transparency and impinging upon sensitized paper during the making of a print,
(b) means operable to measure the intensities of several different color components of the light beam of said photographic printer including a first photosensitive tube operable to pass a current proportional to the intensity of one color component in the light beam impinging thereon and a second photosensitive tube operable to sequentially pass a current proportional to the intensity of a second and then a third color component in the light beam impinging thereon,
(c) voltage generating means connected to said photosensitive tubes and operable in response to the passage of current therethrough to produce voltages proportional to such respective current values, and said voltage generating means being operable in response to the intensity of the light initially passing through said respective color filters to cause a voltage differential between a first and second of said proportional voltages and between the first and a third proportional voltages respectively,
(d) electronic switching means connected to said voltage generating means and operable to cause illumination of an electric indicator lamp upon adjustment of said color filters and said voltage differentials thereupon becoming zero, and
(e) density measuring means for independently determining the proper density for a photographic print comprising a third photosensitive tube energizable from a rectified supply source and operable to pass a current proportional to the intensity of the light beam impinging thereon from the light beam passed through the film transparency, said rectified supply source including a variable resistor operable disproportionally with exposure time to compensate for failure of reciprocity and a direct current source for supplying a constant reference voltage connected to said third photosensitive tube, and said density measuring means including an electronic tube operable to cause illumination of a second electric indicator lamp when a differential voltage is produced between the constant reference voltage and the voltage from said rectified source in response to a predetermined light intensity impinging upon said third photosensitive tube.

5. A color balance computer for photographic printers and enlargers used in the making of color prints comprising:
 (a) a plurality of color filters each of which is operable to control the intensity of light of one of the primary colors in a light beam passed through a film transparency and impinging upon sensitized paper during the making of a print,
 (b) means operable to measure the intensities of several different color components of the light beam of said photographic printer including a housing supporting a first photosensitive tube operable to pass current proportional to the intensity of one color component in the light beam impinging thereon after passing through one primary color filter, and a second photosensitive tube in said housing surrounded by a shield having filters of two other primary colors forming a part of the wall thereof, and said shield being rotatable to subject said second photosensitive tube to the light beam after passing first through one filter and then the other to render such tube operable to sequentially pass a current proportional to the intensity of a second and then a third color component of said light beam,
 (c) voltage generating means connected to said photosensitive tubes and operable in response to the passage of current therethrough to produce voltages proportional to such respective current values, and said voltage generating means being operable in response to the intensity of the light initially passing through said respective color filters to cause a voltage differential between a first and second of said proportional voltages and between the first and a third proportional voltages respectively,
 (d) electronic switching means connected to said voltage generating means and operable to cause illumination of an electric indicator lamp upon adjustment of said color filters and said voltage differentials thereupon becoming zero, and
 (e) density measuring means for independently determining the proper density for a photographic print comprising a second housing adapted to be disposed in the light beam passing through the film transparency and containing a third photosensitive tube surrounded by a shield having a variable cross-sectioned aperture calibrated in equal density shifts for equal angles of rotation, said third photosensitive tube being energizable from a rectified supply source and operable to pass a current proportional to the intensity of the light beam impinging thereon through said calibrated aperture from the light beam emanating through the film transparency, said rectified supply source including a variable resistor operable disproportionally with exposure time to compensate for failure of reciprocity and a direct current source for supplying a constant reference voltage connected to said third photosensitive tube, and said density measuring means including an electronic tube operable to cause illumination of a second electric indicator lamp when a differential voltage is produced between the constant reference voltage and the voltage from said rectified source in response to a predetermined light intensity impinging upon said third photosensitive tube.

References Cited
UNITED STATES PATENTS 3,292,488 12/1966 Griffith _____ 88—24
3,293,033 12/1966 Maddock et al. ____ 250—226 X
3,312,144 4/1967 Neale _____ 88—24

RALPH G. NILSON, *Primary Examiner.*
WALTER STOLWEIN, *Examiner.*
J. D. WALL, *Assistant Examiner.*